(12) United States Patent
Sisto

(10) Patent No.: US 10,890,291 B2
(45) Date of Patent: Jan. 12, 2021

(54) ADJUSTABLE MOUNTING DEVICE FOR A POLE

(71) Applicant: Salvatore Sisto, Bradley Beach, NJ (US)

(72) Inventor: Salvatore Sisto, Bradley Beach, NJ (US)

(*) Notice: Subject to any disclaimer, the term of this patent is extended or adjusted under 35 U.S.C. 154(b) by 0 days.

(21) Appl. No.: 16/197,975

(22) Filed: Nov. 21, 2018

(65) Prior Publication Data

US 2019/0154195 A1 May 23, 2019

Related U.S. Application Data

(60) Provisional application No. 62/589,347, filed on Nov. 21, 2017.

(51) Int. Cl.
| | |
|---|---|
| *A47B 96/06* | (2006.01) |
| *F16M 13/02* | (2006.01) |
| *A47G 29/08* | (2006.01) |
| *A47G 29/087* | (2006.01) |
| *E04H 15/32* | (2006.01) |
| *A47K 5/05* | (2006.01) |
| *A47K 3/28* | (2006.01) |
| *E04H 12/00* | (2006.01) |

(52) U.S. Cl.
CPC .......... *F16M 13/022* (2013.01); *A47G 29/08* (2013.01); *A47G 29/087* (2013.01); *E04H 15/32* (2013.01); *A47K 3/281* (2013.01); *A47K 5/05* (2013.01); *E04H 12/00* (2013.01); *F16M 2200/025* (2013.01)

(58) Field of Classification Search
CPC ...... A47C 16/025; A47K 10/38; A47B 57/567
See application file for complete search history.

(56) References Cited

U.S. PATENT DOCUMENTS

| | | | |
|---|---|---|---|
| 1,561,432 A | 11/1925 | Hitchcock | |
| 2,123,695 A * | 7/1938 | Elmer | A47F 5/06 248/230.2 |
| 2,564,476 A | 8/1951 | Fregan | |
| 2,774,562 A | 12/1956 | Henry | |
| 3,194,526 A | 7/1965 | Bruce | |
| 3,561,563 A | 2/1971 | Harsh | |
| 3,961,822 A * | 6/1976 | Daniel | A47C 16/025 297/423.1 |
| 3,995,796 A * | 12/1976 | Kline | A45F 3/44 248/121 |
| 4,415,137 A | 11/1983 | Garves | |
| 5,388,796 A * | 2/1995 | Sullivan | A47B 57/567 108/108 |

(Continued)

*Primary Examiner* — Amy J. Sterling
(74) *Attorney, Agent, or Firm* — Belles Katz LLC

(57) ABSTRACT

A device for mounting a support apparatus or item to a pole-like structure includes a support item for use by a user to store a personal-use article, a mounting bracket configured to slideably engage the pole-like structure in a plurality of user-selectable mounted positions, and a rotatable clamping arm of the support item. The clamping arm is pivotably coupled to the bracket and rotatable into and out of locking engagement therewith between locked and unlocked positions. The support item may include a stopping surface which comes into contact with an upper edge of the bracket when the clamping arm is in the unlocked position to prevent damaging the pole-like structure.

21 Claims, 20 Drawing Sheets

(56) References Cited

U.S. PATENT DOCUMENTS

| | | |
|---|---|---|
| D460,651 S | 7/2002 | Jobe et al. |
| 6,575,316 B2 * | 6/2003 | Lin ........................ A47K 10/38 |
| | | 211/107 |
| 6,688,238 B1 | 2/2004 | Alexiou |
| 6,719,259 B2 * | 4/2004 | Huang ................. A47B 96/061 |
| | | 248/230.2 |
| 7,341,230 B2 * | 3/2008 | Beaudry ................. A47G 7/044 |
| | | 248/219.4 |
| 8,438,673 B2 | 5/2013 | Bell |
| 2009/0308998 A1 * | 12/2009 | Felmeri ..................... E03C 1/06 |
| | | 248/295.11 |
| 2011/0198548 A1 * | 8/2011 | Walker, Jr. ............. A01K 3/005 |
| | | 256/10 |
| 2014/0311999 A1 | 10/2014 | Lindo et al. |
| 2017/0130893 A1 | 5/2017 | Wichman |

\* cited by examiner

ADJUSTABLE MOUNTING DEVICE FOR A POLE

CROSS-REFERENCE TO RELATED APPLICATIONS

The present application claims the benefit of priority to U.S. Provisional Application No. 62/589,347 filed Nov. 21, 2017, which is incorporated herein by reference in its entirety.

FIELD

The present invention relates generally to adjustable mounting devices, and more particularly to adjustable mounting devices for adjustably mounting a support apparatus or item to an elongated support structure such as a tube, rod, rail, post, or pole.

BACKGROUND

There are many instances where it is desirable to attach a support member or item to a tube, rod, pole, rail, or other longitudinally elongated support structure. For example, in a shower, bathtub, or other bathroom setting, it can be useful to attach a support item such as a soap dish, shelf, shower head, toothbrush holder, or other items to a pole or other longitudinal structure which provides support and storage. While other mounting devices exist for such applications, they often operate in such a way that the pole to which the device is mounted can be easily marked, dented, or otherwise damaged by installing and removing the device.

Accordingly, improved mounting devices for adjustably mounting a support item to a pole or other longitudinal support structure that do not mark, dent, mar, or otherwise damage the pole are needed.

SUMMARY

A mounting device and system according to the present disclosure provides a secure way to removably and adjustably mount a support apparatus or item in a cantilevered manner to a longitudinally elongated support structure such as without limitation a tube, rod, pole, rail, or other similar structure in such a way as to not mark, dent, or otherwise damage the pole. These support structures may be collectively and interchangeably referred to herein for convenience as a "pole" or "pole-like" structure herein, which may be of circular, polygonal, non-polygonal, or rectilinear (e.g. square or rectangular) transverse cross section. The support item generally comprises a supporting arm configured for holding a personal-use article or accessory (e.g soap, bottled personal care products, shower head, toothbrush, etc.) and a rotating clamping arm angularly disposed relative to the supporting arm. In one embodiment, the clamping arm may be perpendicularly angled relative to the supporting arm forming an L-shaped support item body. Clamping arm is pivotably mounted to a mounting bracket slideably engaged with the pole by a transversely oriented pivot pin extending through the clamping arm and bracket. The mounting bracket is configured to slideably engage the pole in a plurality of user-selectable mounted positions.

The support item for the personal-use article may be constructed so that the clamping arm is rigidly affixed to or integrally formed as a unitary structural part of the supporting arm. The clamping arm is configured to lockingly clamp the support item onto the pole when the item (a soap dish for example or other) is rotated down into an in-use position. The clamping arm is movable between a downward locked position in which the arm lockingly engages the pole so that support item cannot slide slid up or down, and an upward unlocked position in which the arm disengages the pole so that the position of the support item on the pole may be slideably adjusted to a desired height/elevation. Rotating the clamping arm concomitantly rotates the supporting arm between a generally horizontal in-use position for actively holding the personal use article and a vertical storage position. The invention advantageously achieves a secure mounting without marking, denting, or otherwise damaging the pole by providing a mechanical stop that prevents the item from contacting the pole when the item is rotated upward to an adjustment position to allow sliding movement of the support item relative to the pole.

In one aspect, a device for mounting a support item to a pole-like structure comprises: a vertically oriented pole-like structure having a circumference; a mounting bracket slideably coupled to the pole-like structure, the mounting bracket configured to wrap around more than half of the circumference of the longitudinal support structure, the mounting bracket having an upper edge; the support item comprising a rotatable clamping arm pivotably attached to the mounting bracket such that the clamping arm is configured to rotate into and out of locking engagement with the pole-like structure; the support item being slideable on the pole-like structure when the clamping arm is rotated out of engagement with the pole-like structure in an unlocked position, the support item being locked in position on the pole-like structure when the clamping arm is rotated into engagement with the pole-like structure; a pivot pin pivotably attaching the rotatable clamping arm to the mounting bracket; and a stopping surface on the support item, the stopping surface coming into contact with the upper edge of the mounting bracket when the clamping arm is in the unlocked position to prevent damaging the pole-like structure.

In another aspect, a system for mounting a support apparatus comprises: a vertically oriented cylindrical pole having a circumference; a mounting bracket comprising a semi-cylindrical collar slideably engaged with the pole and a pair of spaced apart parallel flanges extending laterally outwards from the collar; the support apparatus having an angular body comprising a supporting arm configured for holding a personal-use article and a rotatable clamping arm extending perpendicularly from the supporting arm; the support apparatus coupled to the mounting bracket by a pivot pin, the support apparatus being pivotably movable between an unlocked position in which the supporting arm is horizontally oriented, and a locked position in which the supporting arm is vertically oriented; the clamping arm configured and operable to move into and out of locking engagement with the pole by selectively rotating the supporting arm; the support apparatus being slideable up and down the pole when the clamping arm is disengaged from the pole; the support apparatus being locked in position on the pole when the clamping arm is engaged with the pole. In one embodiment, the pivot pin is a tightenable bolt transversely mounted through the flanges of the mounting bracket to form a horizontal pivot axis of the support apparatus. The clamping arm is arranged between the flanges and configured such that tightening the bolt does not operate to lock the support apparatus in position on the pole, but instead merely compresses the clamping arm between the flanges. The clamping arm operations to lock the support apparatus to the pole via frictional engagement.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 1:
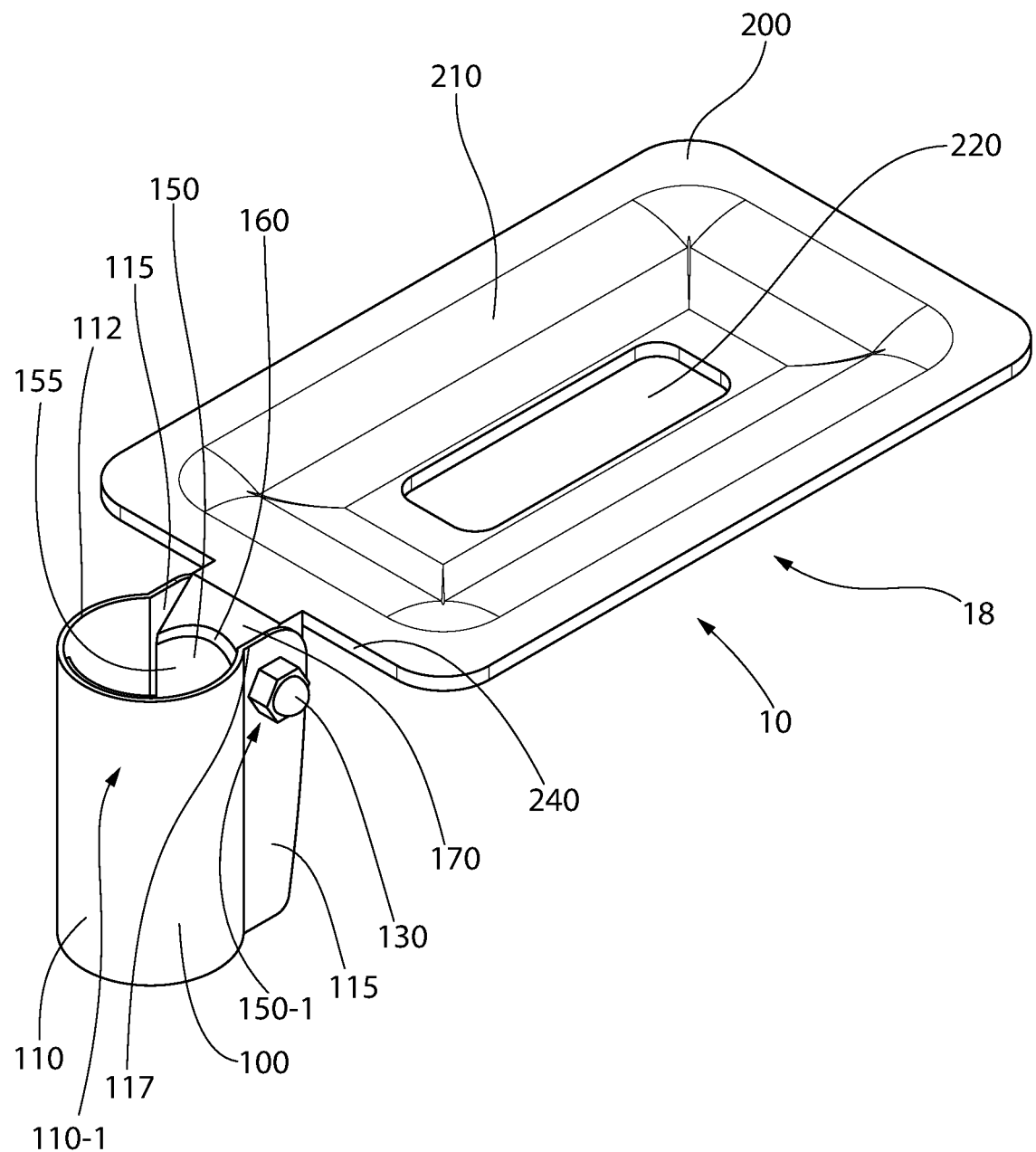
FIG. 1 is an upper perspective view of a soap dish in accordance with exemplary embodiments of the invention.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The following description of the embodiment(s) is merely exemplary ("example") in nature and is in no way intended to limit the invention, its application, or uses.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "connected," "coupled," "interconnected," and similar refer to a relationship wherein structures are secured or attached to one another either directly or indirectly through intervening structures, as well as both movable or rigid attachments or relationships, unless expressly described otherwise. The term "fixed" refers to two structures that cannot be separated without damaging one of the structures. The term "filled" refers to a state that includes completely filled or partially filled.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

As stated above, a mounting device according to the present disclosure provides a secure way to removably and adjustably mount a support apparatus or item to a pole or other longitudinal structure in such a way as to not mark, dent, or otherwise damage the pole. A rotating clamping arm is provided that clamps onto the pole when the item (a soap dish for example) is rotated down into an in-use position. The invention achieves a secure mounting without marking, denting, or otherwise damaging the pole by providing a mechanical stop that prevents the item from contacting the pole when the item is rotated upward to allow movement of the device relative to the pole.

Figure 10:
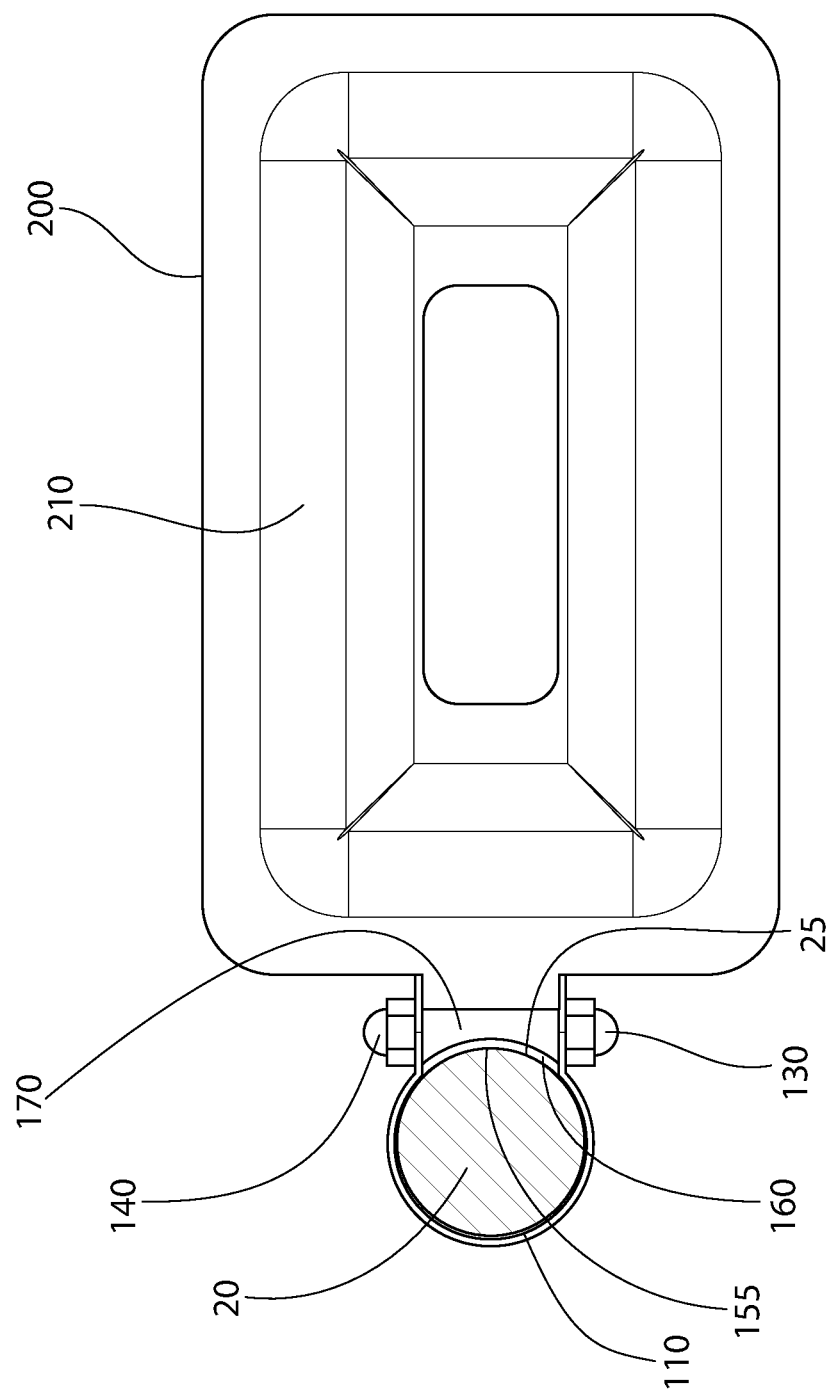
FIG. 10 is a top view of the soap dish shown in FIG. 9.
Figure 11:
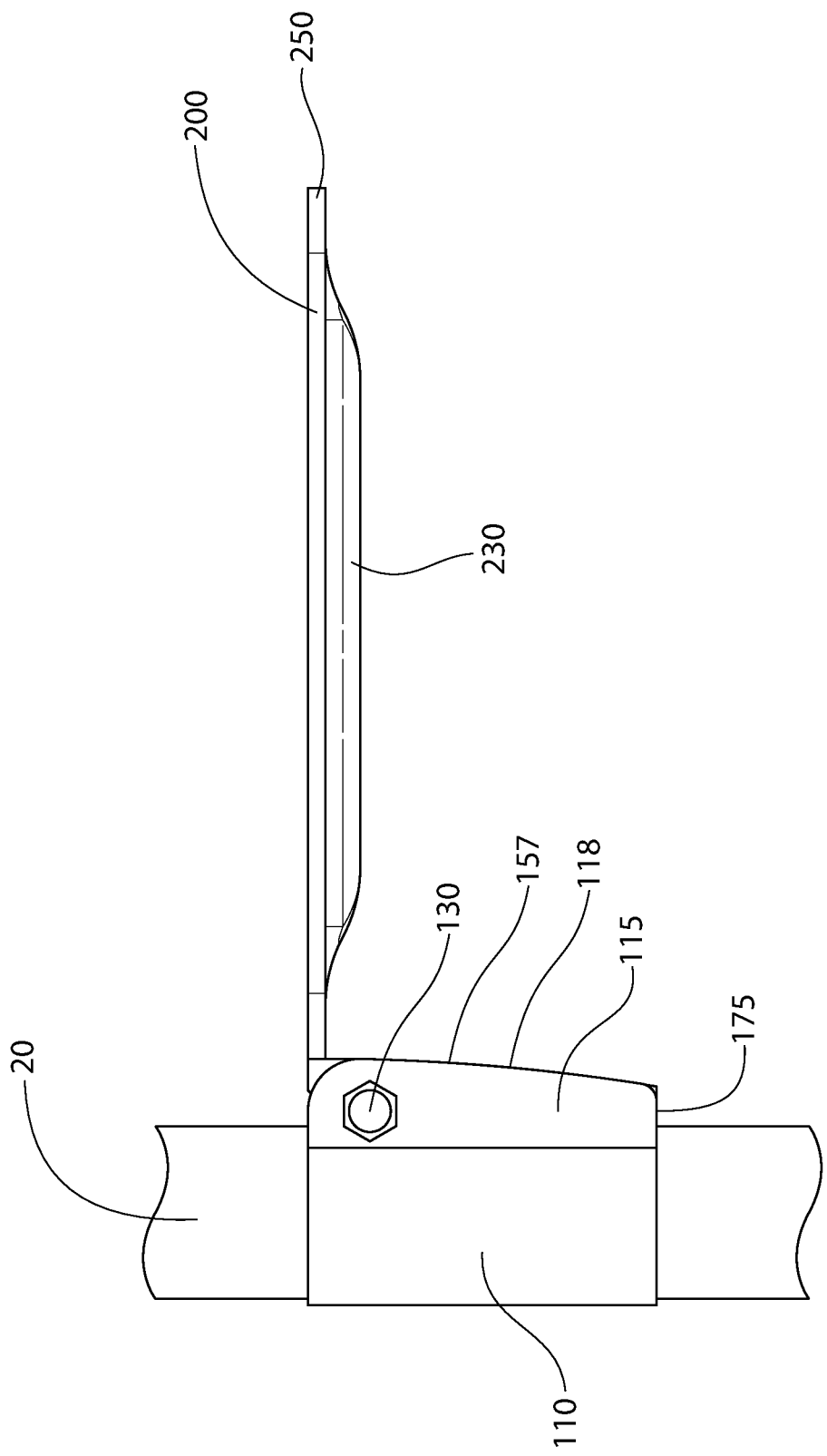
FIG. 11 is a side view of the soap dish shown in FIG. 9.

FIG. 1 shows an exemplary embodiment of a mounting device for a support item 18 according to the invention. FIG. 11 shows the mounting device mounted to the pole which is vertically oriented and mounted from an appropriate support surface(s) when in use (e.g. floor, ceiling, and/or wall, etc.). A soap dish assembly 10 is used in this first example to illustrate the support item 18 (FIGS. 1-14). It is noted a mounting device in accordance with the invention can be used as a part of many other items to be mounted or as a standalone mount to which an item or items can be attached or supported (FIGS. 15-23). Accordingly, a plurality of different support items may be provided and mounted on a single longitudinally-extending pole-like structure.

In FIG. 1, soap dish assembly 10 has a shelf 200 defining the "supporting arm" of the support item 18 that is configured to hold a bar of soap. Shelf 200 has an upper side 210 for supporting the bar of soap and an opening 220 to prevent water from collecting under the bar of soap. Shelf 200 is rigidly attached to, or is an integral unitary structural part of, a rotatable "clamping arm" 150. Clamping arm 150 may be perpendicularly oriented relative to the shelf 200.

A mounting assembly 100 is attached to rotatable clamping arm 150 by way of a pivot pin 150-1 so that rotatable clamping arm 150 can rotate relative to mounting assembly 100. In this example, the pin is a bolt 130 that extends through mounting assembly 100 and rotatable clamping arm 150 and is held in place by a nut 140 (shown in FIG. 2). Bolt 130 is transversely oriented and defines a horizontal axis of rotation (pivot axis) for the support item (i.e. shelf 200 and clamping arm 150). Nut 140 is tightened sufficiently to hold the various elements securely in place while still allowing rotatable clamping arm 150 to rotate relative to mounting assembly 100 under the force exerted by a user in normal use. It bears noting that the clamping arm 150 is arranged between flanges 115 of the mounting bracket 110, so tightening the bolt 130 will not be sufficient to lock the soap dish 200 in position on the pole 20. Rather, tightening the bolt merely holds the soap dish and mounting bracket assembly together. While a bolt and nut are shown in this example, it is noted that a bolt and a wingnut or other securing element can be used to allow a user to adjust the tension on rotatable clamping arm 150 without the use of tools.

The supporting arm of the soap dish assembly 10 which defines soap shelf 200 extends horizontally outwards from clamping arm at a point above the pivot pin (see, e.g. FIG. 11). The soap dish assembly may be generally L-shaped such that the mating terminal ends of the shelf 200 and clamping member 150 meet perpendicularly at a corner therebetween.

Mounting assembly 100 includes a mounting bracket 110 having a collar-like mounting portion 110-1 (aka simply "collar") which is complementary configured to slideably engage the pole 20. The mounting portion 110-1 may be configured to wrap circumferentially around more than half of the circumference of the pole 20, but in the illustrated embodiment not entirely around the circumference. In this non-limiting example, the mounting portion 110-1 of the bracket 110 is tubular having a semi-cylindrical body with a semi-circular transverse cross sectional shape so as to closely conform to a circular or cylindrical pole 20. The mounting portion 110-1 in this example therefore does not form a completely circular tube but rather has vertical edges which are spaced apart forming a gap therebetween for receiving clamping arm 150 (see, e.g. FIG. 1). In other embodiments, the pole 20 may have other suitable polygonal or non-polygonal cross sectional shapes (e.g. rectangular, square, hexagonal, etc.) and the bracket will thus have a complementary configured cross-sectional shape to create a substantially conformal fit with the pole to avoid looseness. For simplicity, the terms "pole" or "pole-like structure" will be used in this description to represent a tube, pole, rail, rod, post, or other longitudinal support structure of hollow or solid construction to which mounting assembly 100 is attached.

Figure 2:
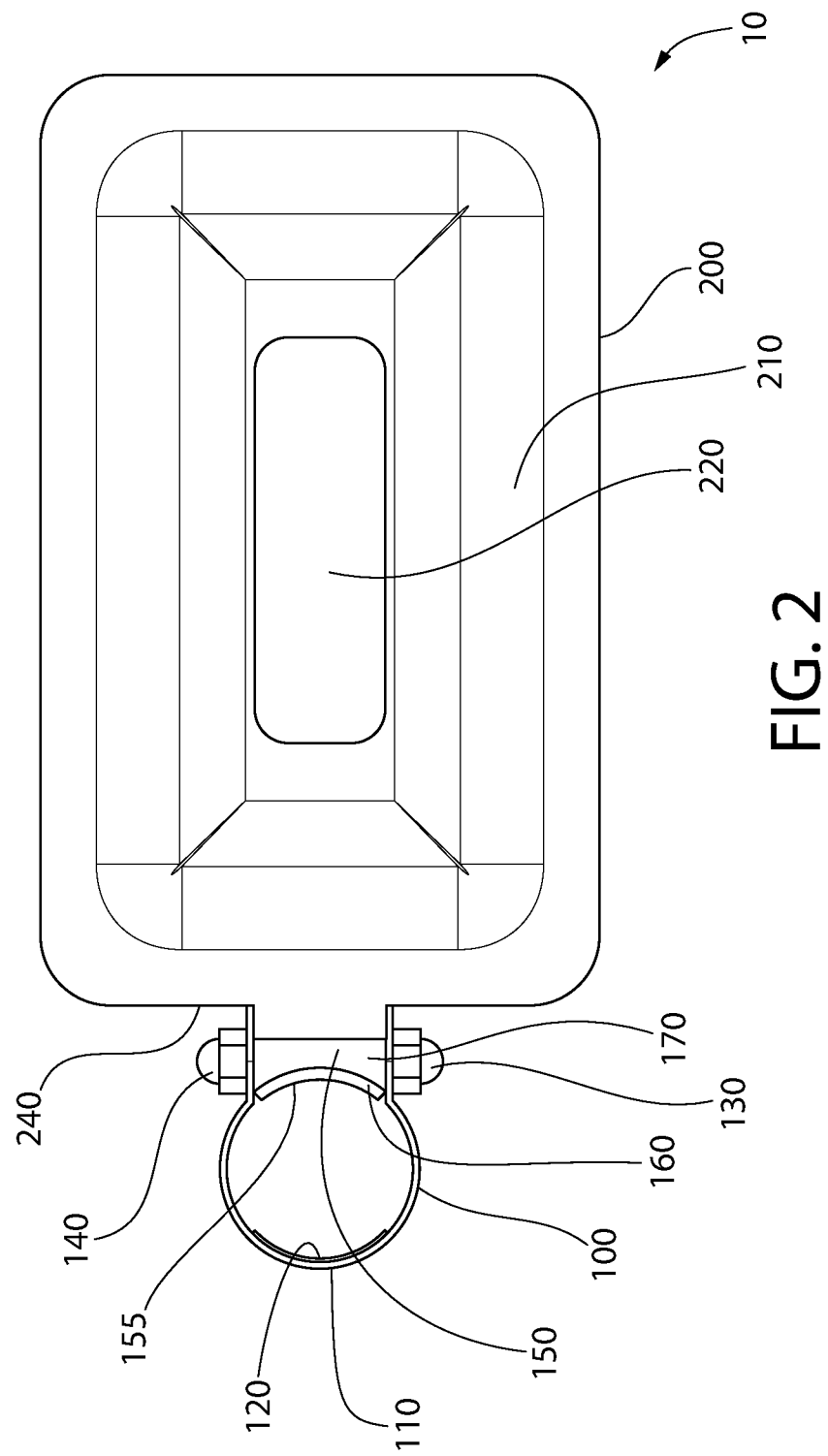
FIG. 2 is a top view of the soap dish shown in FIG. 1.

Bracket 110 further includes a spaced apart and parallel pair of flanges 115. Flanges 115 extend laterally and horizontal outwards from collar 110-1, such as from the vertical edges of the collar as seen in FIGS. 1 and 2. Flanges 115 may be used for mounting pivot pin 150-1 to the bracket 110, as further described herein.

During installation, bracket 110, while detached from the soap dish assembly 10 and without pivot pin 150-1 in place, can deform and be spread apart at the flanges 115 and pushed onto the pole 20 in a direction transverse to the longitudinal axis of the pole 20. To help protect the pole, a protective and frictional lining 120 (FIG. 2) is provided inside bracket 110. The clamping arm 150 of the support item (e.g. soap dish assembly 10) can then be inserted between the flanges 115 and coupled thereto by the pivot pin 150-1. In one embodiment, a lining 120 formed of a resiliently deformable elastomeric or rubber material may be coated onto the inside of the mounting portion collar 110-1 of the bracket 110. The resiliently deformable lining not only protects the pole, but also creates added friction at the lining-to-pole interface to help prevent the bracket from sliding down the vertically oriented pole when the clamping arm 150 is in the locked position. Although lining 120 is shown covering just a portion of the inside of bracket 110, it is noted that lining 120 can cover other portions or all of the inside of bracket 110 that comes in contact with the pole.

A lining 120 can also be provided on contact surface 155 of rotatable clamping arm 150 to protect the pole. Contact surface 155 is arcuately curved and concave to contact the arcuate circumference of the pole when soap dish assembly 10 is in an "in-use" position (see, e.g. FIG. 2 and further description below). After bracket 110 is in place on the pole, rotatable clamping arm 150 is moved into position between flanges 115 of bracket 110 and bolt 130 is inserted through flanges 115 and rotatable clamping arm 150. Nut 140 is then tightened onto bolt 130 to hold the assembly together. Nut 140 is tightened sufficiently to securely hold the assembly together while still allowing rotatable clamping arm 150 to rotate relative to bracket 110 and the soap dish 200 to slide up/down the pole 20.

Rotatable clamping arm 150 automatically exerts a clamping force on the pole due to gravity acting on soap dish 200. The force exerted on the pole by rotatable clamping arm 150 thus creates a sufficient friction force to prevent soap dish assembly 10 from sliding down the pole or rotating relative to the pole. The weight of the soap dish creates a force vector which acts vertically through the center of mass of the dish (somewhat proximate to the lead line for numerical reference 230 in FIG. 11). This weight force vector is spaced apart from clamping arm by a horizontal distance (i.e. moment arm) from the pivot axis created by bolt 130. This creates a moment attributable to gravity about the pivot axis (clockwise in FIG. 11), in which the soap dish wants to rotate fully downwards but is stopped by the engagement between the contact surface 155 of clamping arm 150 and the side of the pole 20. The soap dish is therefore automatically retained in the desired vertical position on the pole by the mutual engagement without use of any tools. The clamping arm 150 is disposed between the flanges and configured such that tightening the bolt 130 does not operate sufficiently to lock the support apparatus in position on the pole. Tightening the bolt thus merely compresses the mounting bracket flanges 115 against the clamping arm, not the pole 20. The clamping arm 150 is relied upon to hold and lock the soap dish in position on the pole via frictional engagement. Advantageously, this allows the soap dish to slide up/down the pole to the desired position while the clamping arm 150 is not engaged with the pole, and then conveniently be locked in position without tools to tighten the mounting bracket 110 unlike prior known clamp like mounting brackets. It also bears noting that the weight of the soap emplaced on the shelf 200 advantageously further increases the frictional engagement between the lined clamping arm 150 and the pole 20.

As shown in FIG. 1, mounting bracket 110 has an upper edge 112. Flanges 115 each have an upper edge 117 that, in this example, extends contiguously from upper edge 112. Upper edges 117 provide a stop which edges 240 of soap dish 200 contact when soap dish 200 is rotated upward (discussed in more detail below). This prevents the soap dish from contacting and marring or denting the support pole. Rotatable clamping arm 150 has a ramp portion 170 and a bevel 160 that transitions from upper side 210 of soap dish 200 to contact surface 155.

Figure 3:
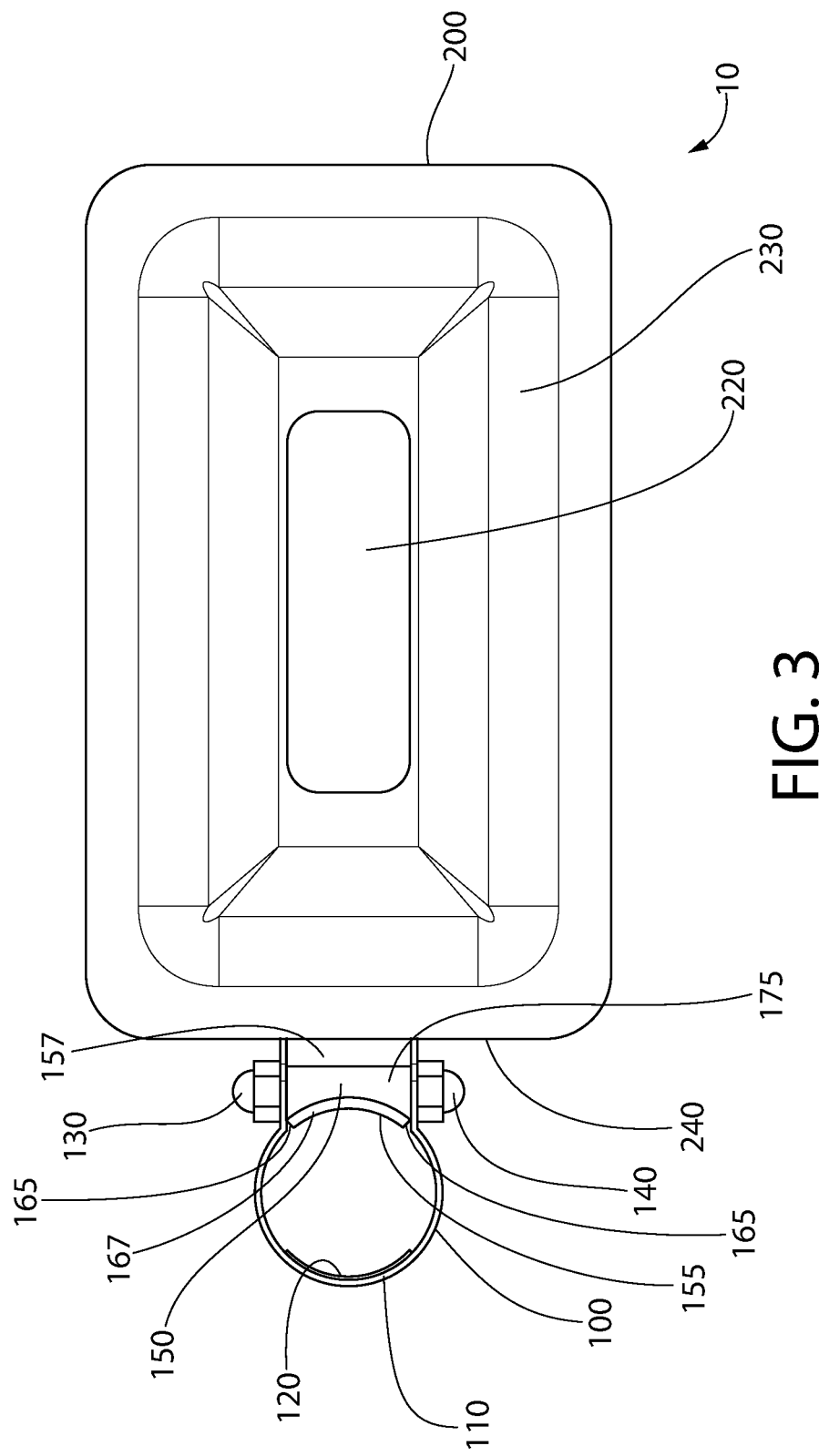
FIG. 3 is a bottom view of the soap dish shown in FIG. 1.

FIG. 2 is a top view of soap dish assembly 10 in the in-use position. In this position, soap dish 200 is substantially horizontal. FIG. 3 is a bottom view of soap dish assembly 10 in the in-use position shown in FIGS. 1 and 2. In FIG. 3, the lower side 230 of soap dish 200 can be seen. Rotatable clamping arm 150 has a rear surface 157, a bottom surface 175, a lower bevel 167, and side bevels 165. The purpose of these features will be discussed below.

Figure 4:
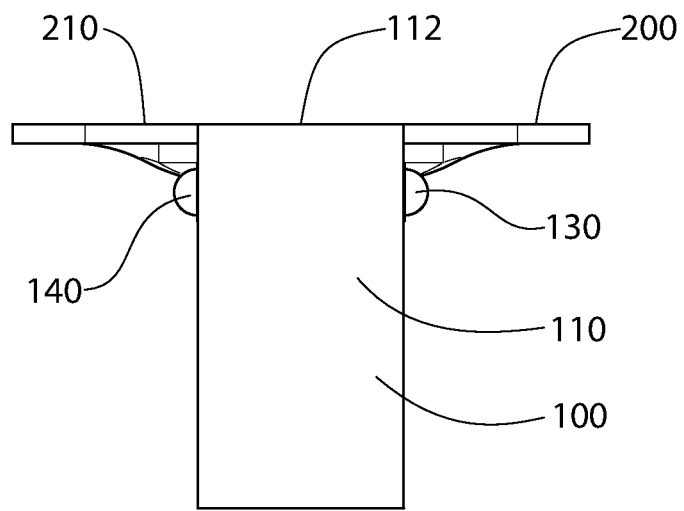
FIG. 4 is a rear view of the soap dish shown in FIG. 1.
Figure 5:
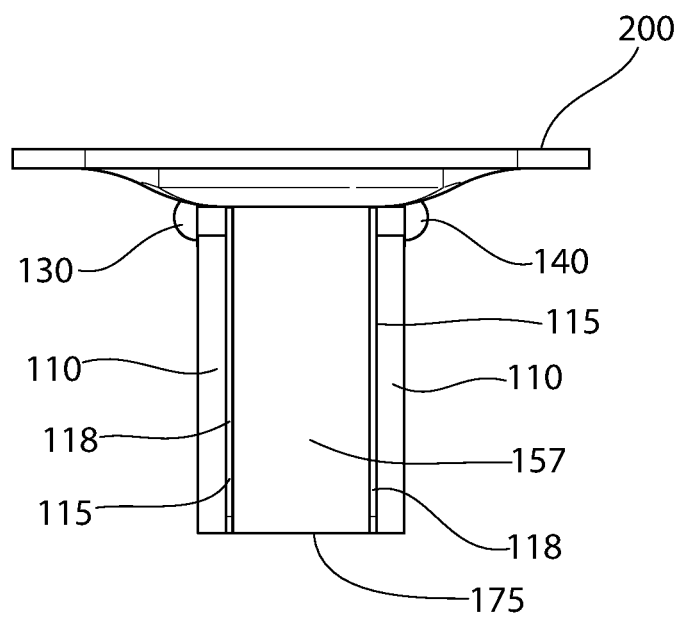
FIG. 5 is a front view of the soap dish shown in FIG. 1.
Figure 6:
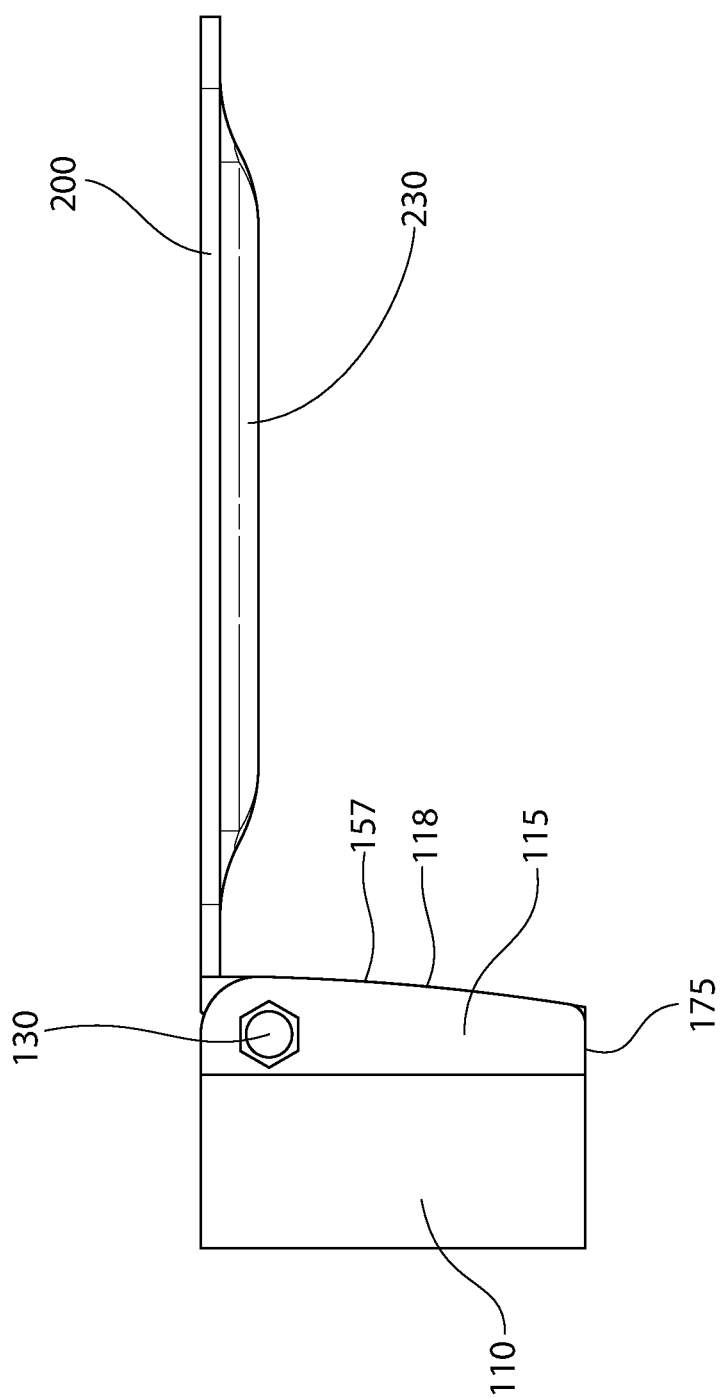
FIG. 6 is a side view of the soap dish shown in FIG. 1.

FIG. 4 is a rear view of soap dish assembly 10. In this example, upper side 210 of soap dish 200 is level with edge 112 of bracket 110. However, it is noted that in other examples, upper side 210 can be higher or lower than edge 112. FIG. 5 is a front view of soap dish assembly 10. In this example, edges 118 of flanges 115 can be seen either side of rear surface 157. In other examples, rear surface 157 of rotatable clamping arm 150 extends laterally to cover edges 118. FIG. 6 is a side view of soap dish assembly 10 in an in-use position. In this example, rotatable clamping arm 150 is substantially flush with flanges 115 such that rear surface 157 of rotatable clamping arm 150 and edges 118 of flanges 115 align. Also, bottom surface 175 of rotatable clamping arm 150 is aligned with the lower edges of flanges 115. However, in other examples some or all of these surfaces and edges are offset.

Once soap dish assembly 10 is installed, it can be moved to another position longitudinally and/or rotationally by lifting soap dish 200, and therefor rotatable clamping arm 150, so that rotatable clamping arm 150 no longer contacts the pole.

Figure 7:
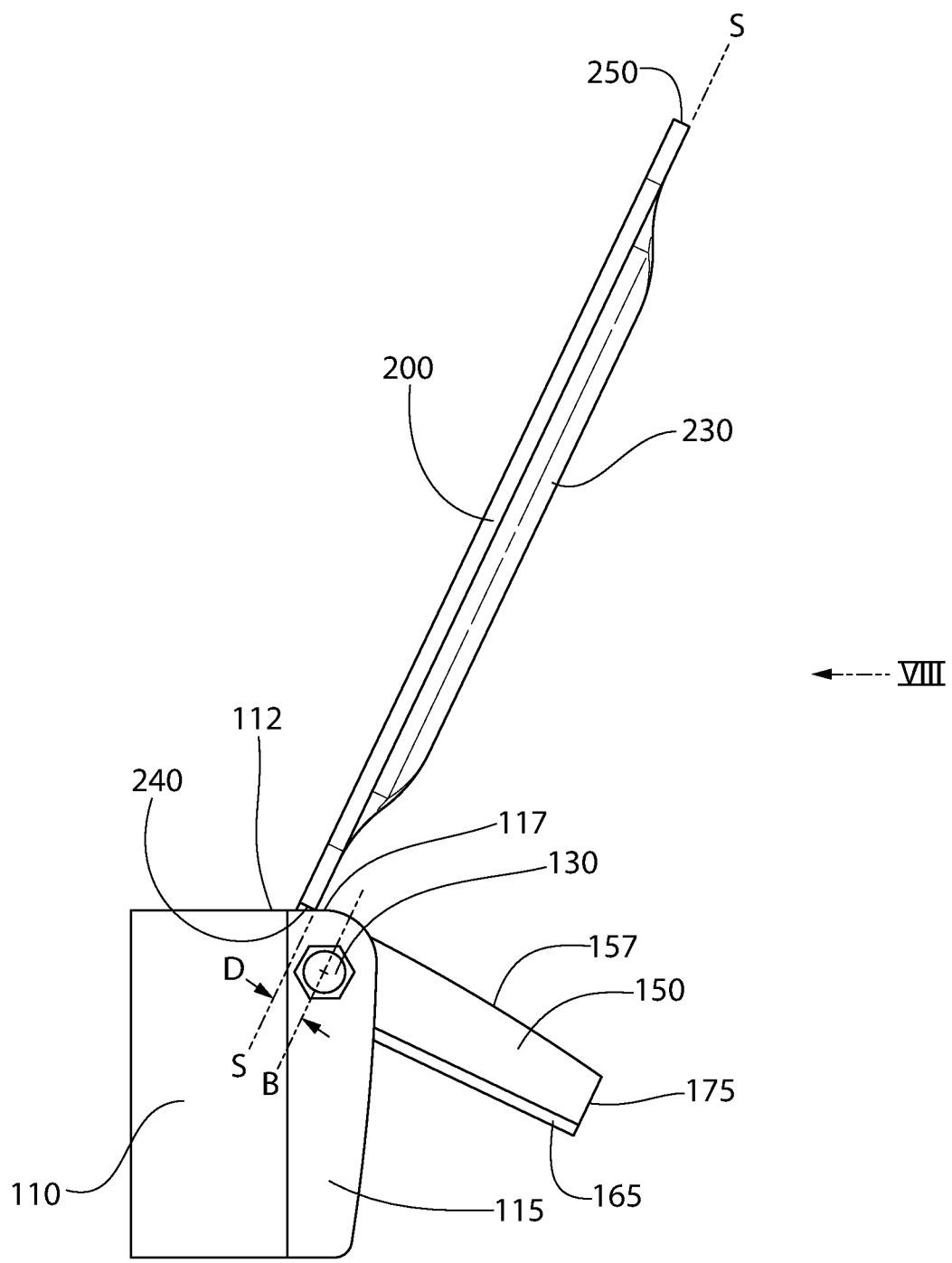
FIG. 7 is a side view of the soap dish shown in FIG. 1 in a rotated state.

FIG. 7 shows soap dish 200 in an elevated position that enables soap dish assembly 10 to be moved relative to the pole. As soap dish 200 is rotated (counter-clockwise in this view) rotatable clamping arm 150 also rotates because rotatable clamping arm 150 is fixed relative to soap dish 200. In this example, rotatable clamping arm 150 is an integral part of soap dish 200. In other examples, rotatable clamping arm 150 is a separate piece but is attached to soap dish 200 in such a way that rotatable clamping arm 150 is fixed relative to soap dish 200. As rotatable clamping arm 150 moves away from the pole, it no longer exerts the force on the pole that prevented soap dish assembly 10 from moving relative to the pole. In this position, soap dish assembly 10 can be moved.

Soap dish assembly 10 has a feature that helps prevent damage to itself and to the pole. When soap dish 200 is rotated upward as shown in FIG. 7, its movement (counter-clockwise in this figure) is limited by edge 240 of soap dish 200 coming into contact with top edge 117 of flanges 115. In this example, soap dish 200 is at the limit of its movement in FIG. 7. Line S represents the lower surface of the portion of soap dish 200 that will contact top edge 117 first. Line B is a line that passes through the rotational axis of bolt 130 and is parallel to line S. Due to the offset D of line S from line B, edge 240 of soap dish 200 swings around the rounded edge of flange 115 until it comes in contact with top edge 117. The interaction between edge 240 and top edge 117 stops the movement of soap dish 200 before soap dish 200 can contact the pole, thereby preventing over-rotation and potential damage to soap dish 200 and/or the pole.

Figure 8:
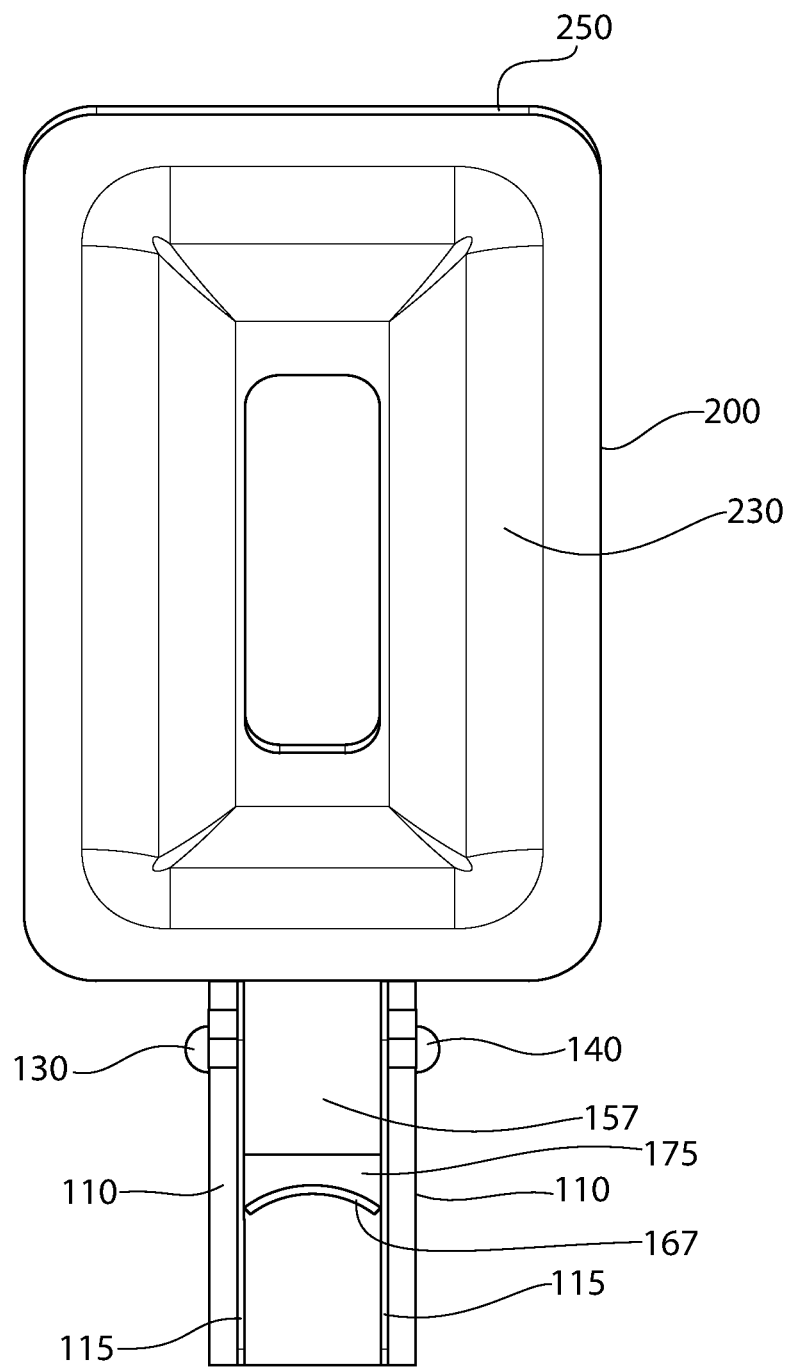
FIG. 8 is a front view of the soap dish shown in FIG. 1 in the rotated state shown in FIG. 7.

FIG. 8 is a view of soap dish assembly 10 looking from the right in FIG. 7.

FIGS. 9-14 show soap dish assembly 10 mounted to a pole 20.

Figure 9:
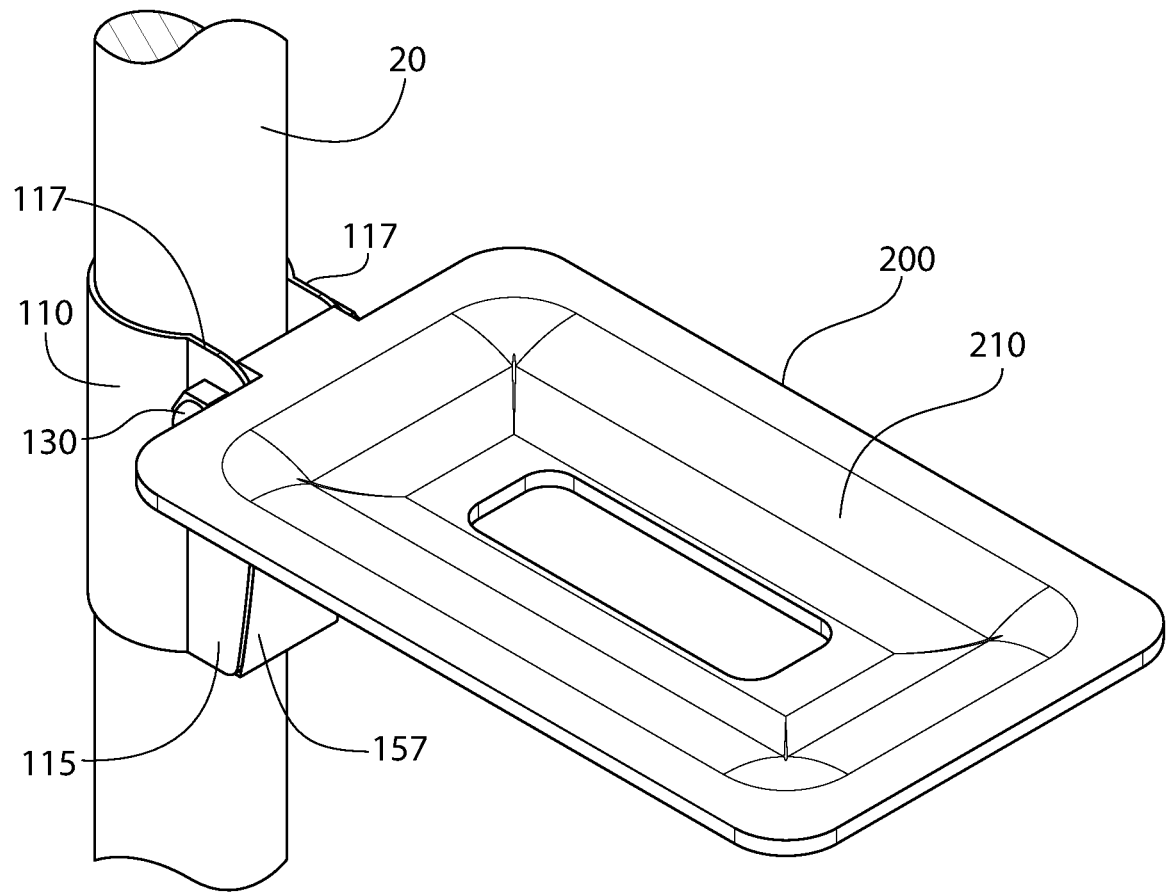
FIG. 9 is an upper perspective view of the soap dish shown in FIG. 1 attached to a pole.

In FIG. 9 soap dish assembly 10 is in an in-use position with rotatable clamping arm 150 pressed against pole 20. FIG. 10 is a top view of soap dish assembly 10 as shown in FIG. 9. In FIG. 10 contact surface 155 of rotatable clamping arm 150 can be seen contacting surface 25 of pole 20. Top bevel 160 and ramp portion 170 of rotatable clamping arm 150 can be seen in this view. Top bevel 160 and ramp portion 170 allow rotatable clamping arm 150 to rotate upward without contacting surface 25 of pole 20. FIG. 11 is a side view of soap dish assembly 10 in an in-use position. In this example, rotatable clamping arm 150 is substantially flush with flanges 115 such that rear surface 157 of rotatable clamping arm 150 and edges 118 of flanges 115 align. Also, bottom surface 175 of rotatable clamping arm 150 is aligned with the lower edges of flanges 115. However, in other examples some or all of these surfaces and edges are offset.

Figure 12:
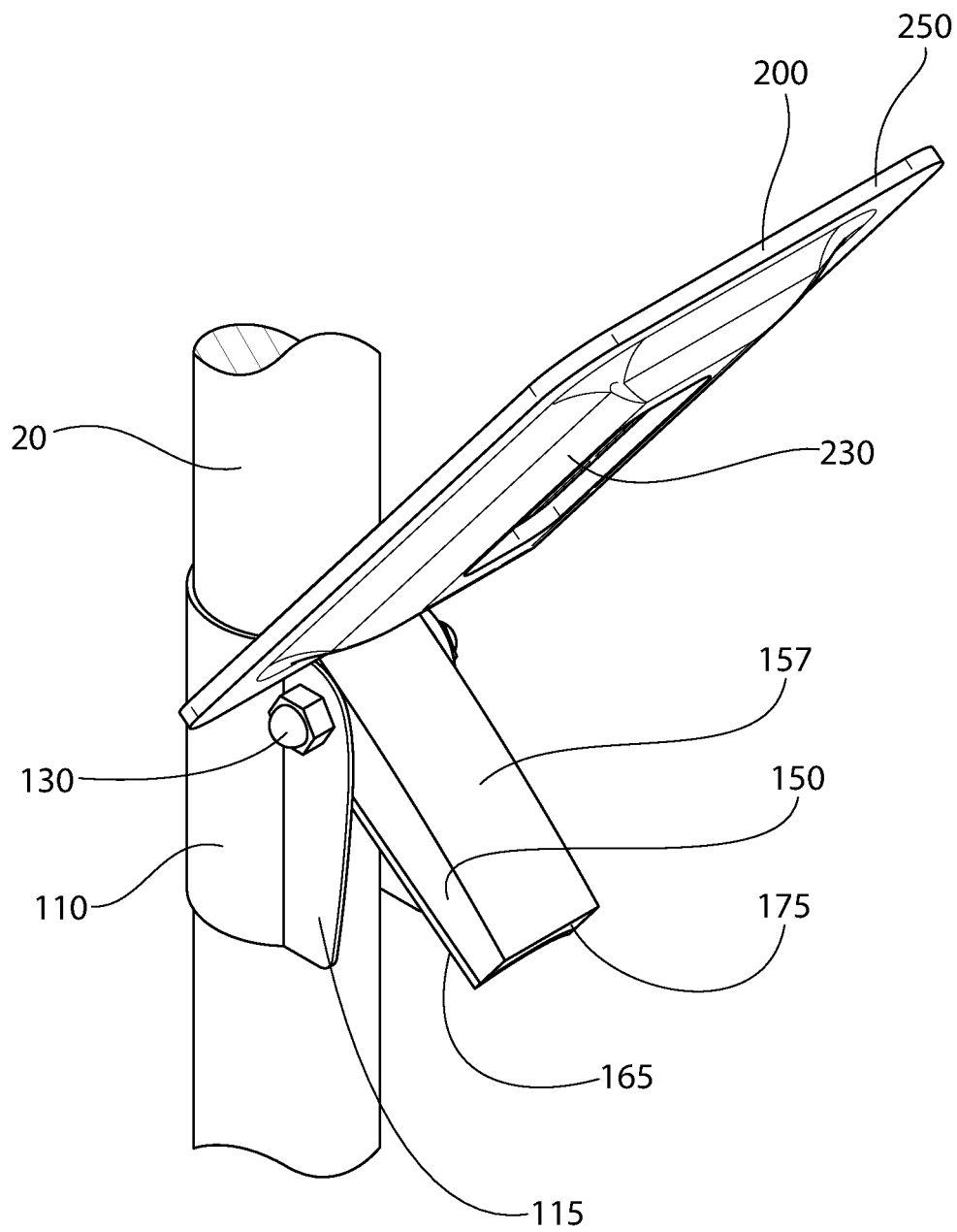
FIG. 12 is a perspective view of the soap dish shown in FIG. 9 in a rotated state.
Figure 13:
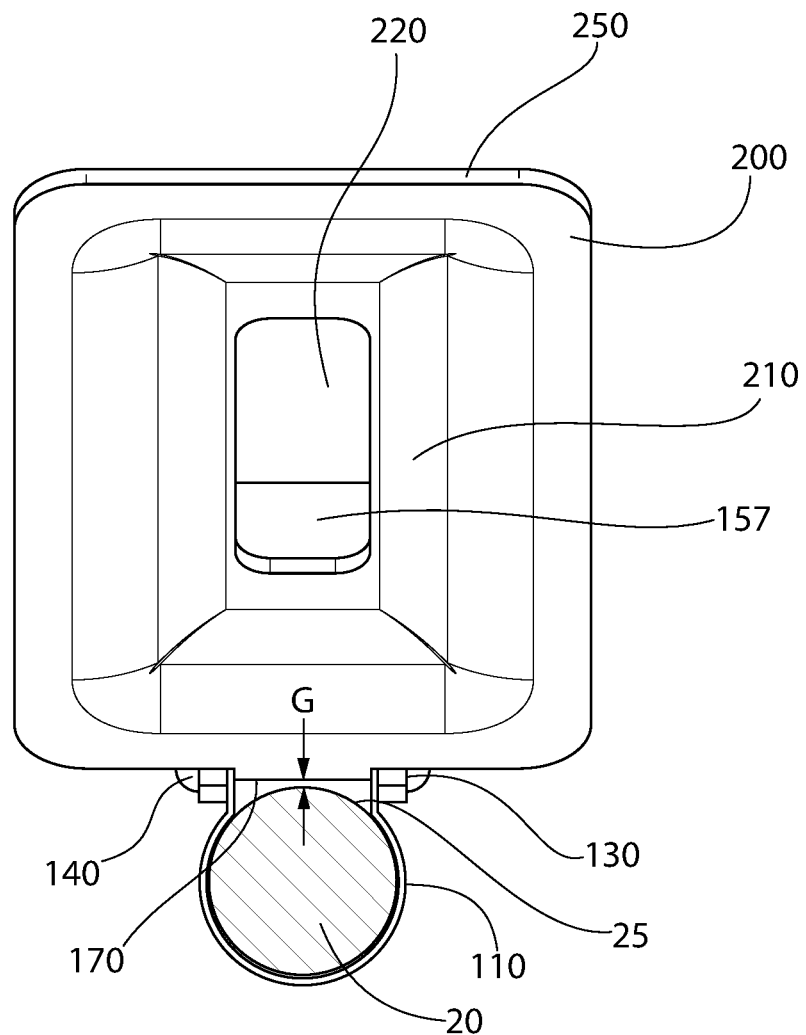
FIG. 13 is a top view of the soap dish shown in FIG. 9 in the rotated state shown in FIG. 12.
Figure 14:
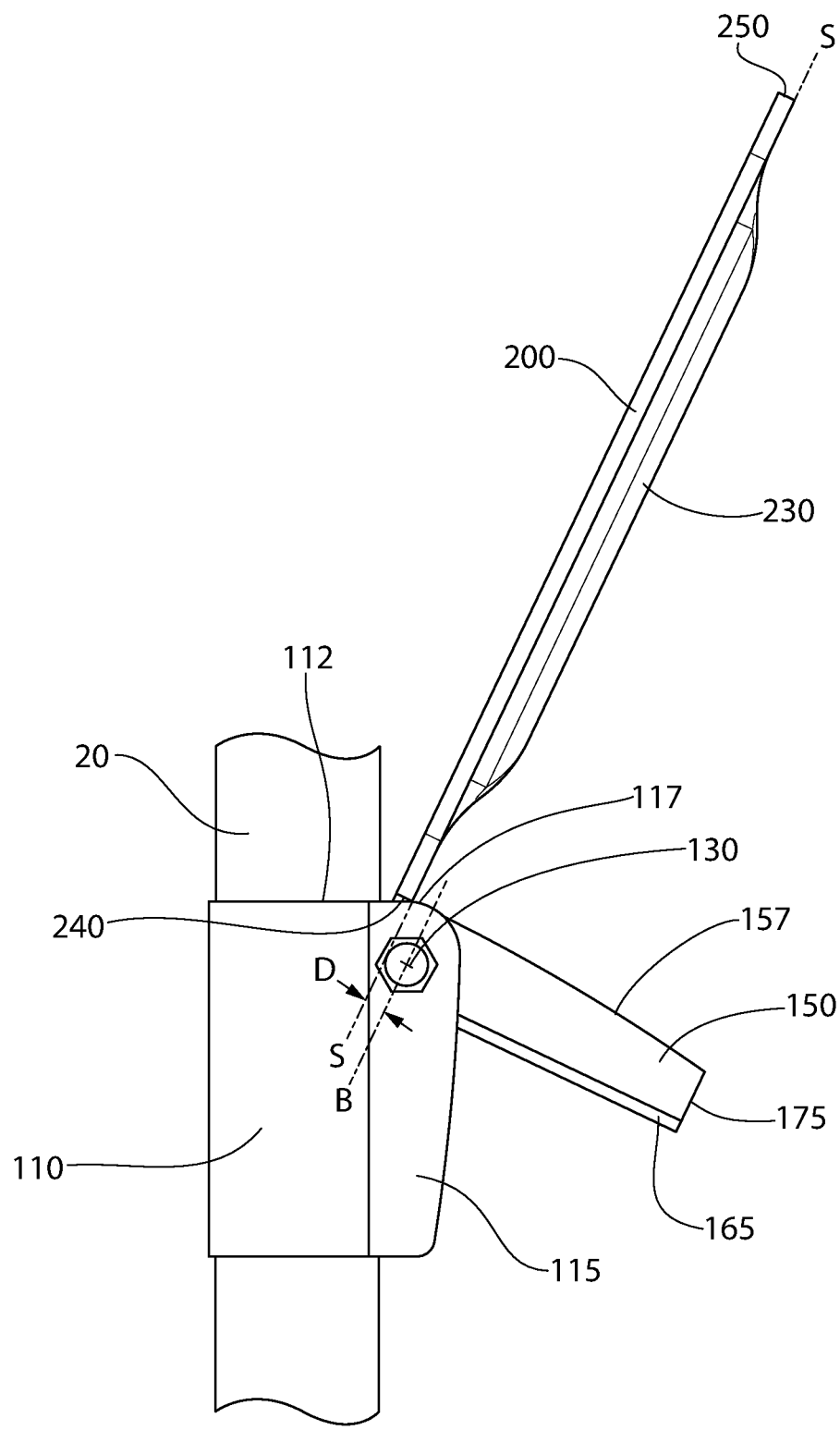
FIG. 14 is a side view of the soap dish shown in FIG. 9 in the rotated state shown in FIG. 12.

FIG. 12 shows soap dish 200 in an elevated position that enables soap dish assembly 10 to be moved relative to pole 20 (similar to the position shown in FIG. 7). FIG. 13 is a top view of soap dish assembly 10 in the position shown in FIG. 12. Rear surface 157 of rotatable clamping arm 150 can be seen through opening 220 in soap dish 200. FIG. 13 shows a gap G that exists between rotatable clamping arm 150 and surface 25 of pole 20. In this example, gap G exists between ramp portion 170 and surface 25. Gap G allows soap dish assembly 10 to be moved longitudinally and/or rotationally without rotatable clamping arm 150 contacting surface 25, therefore preventing rotational arm 150 and pole 20 from being damaged during movement. FIG. 14 is a side view of soap dish assembly 10 in the position shown in FIGS. 12 and 13. Similarly to FIG. 7, FIG. 14 shows that soap dish assembly 10 has a feature that helps prevent damage to itself and to pole 20. When soap dish 200 is rotated upward as shown in FIG. 14, its movement (counter-clockwise in this Figure) is limited by edge 240 of soap dish 200 coming into contact with top edge 117 of flanges 115. In this example, soap dish 200 is at the limit of its movement in FIG. 14. Line S represents the lower surface of the portion of soap dish 200 that will contact top edge 117 first. Line B is a line that passes through the rotational axis of bolt 130 and is parallel to line S. Due to the offset D of line S from line B, edge 240 of soap dish 200 swings around the rounded edge of flange 115 until it comes in contact with top edge 117. The interaction between edge 240 and top edge 117 stops the movement of soap dish 200 before soap dish 200 can contact pole 20, preventing potential damage to soap dish 200 and/or pole 20. The example in FIG. 14 shows a smaller offset D than is shown in the example in FIG. 7. This smaller offset D is simply an illustration that different embodiments can have different dimensions depending on the particular application and/or the desired esthetics.

FIGS. 15-23 show an example of the invention that is configured as a mounting device for mounting a separate item (such as, for example, a shower fixture) to a pole or other longitudinal structure.

Figure 15:
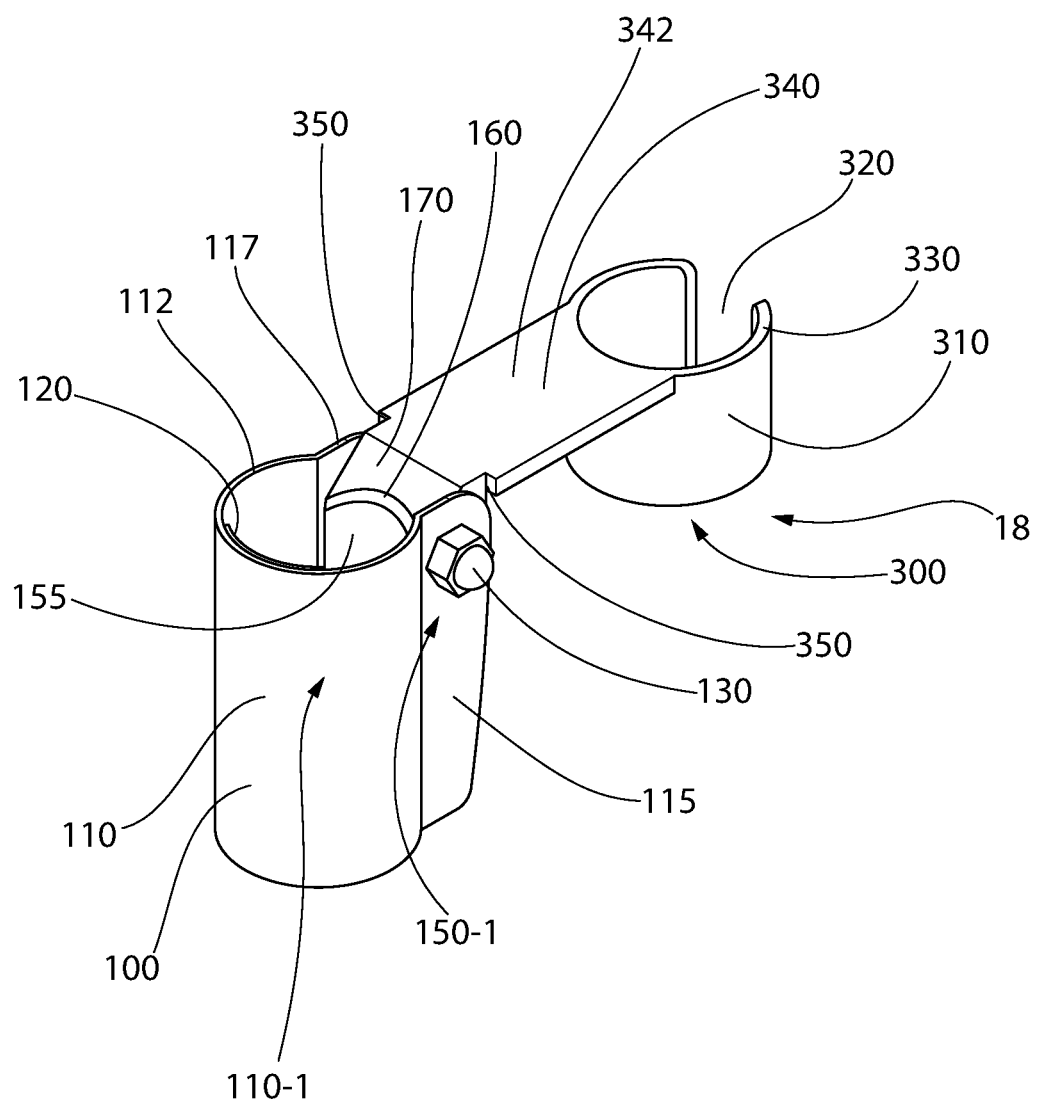
FIG. 15 is an upper perspective view of a mounting device in accordance with exemplary embodiments of the invention.

The mounting device in FIG. 15 is similar to the previously shown examples of the invention in that it has a mounting assembly 100 having a bracket 110, flanges 115, and a pivot bolt 130. Instead of a soap dish as a "supporting arm," this example however has a supporting arm in the shape of a holder 300 that is configured to hold a different type of personal-use article or accessory. In this case, holder 300 is configured to hold a cylindrical body of a personal-use article or accessory by sliding the cylindrical body into a receptacle 310 that is, in this example, round in transverse cross-sectional shape. Receptacle 310 has an opening 320 so that receptacle 310 can flex to grip the accessory. Other shape receptacles can also be used to hold different shaped accessories. Receptacle 310 is attached to rotatable clamping arm 150 by way of a member 340 that has an upper surface 342 and a lower surface 344. The length and shape of member 340 can differ depending on the application. Rotatable clamping arm 150 is fixed relative to member 340 similarly to how rotatable clamping arm 150 is fixed to soap dish 200 in the previous examples. Rotatable clamping arm 150 can be integrally formed with member 340 or can be a separate piece that is positionally fixed to member 340. Member 340 has stop edges 350 formed adjacent to mounting assembly 100. Stop edges 350 perform the same function that edge 240 performed in the previous examples. Stop edges 350 contact edges 117 of flanges 115 to limit how far member 340 can rotate toward the pole to which the mounting device is attached.

Figure 16:
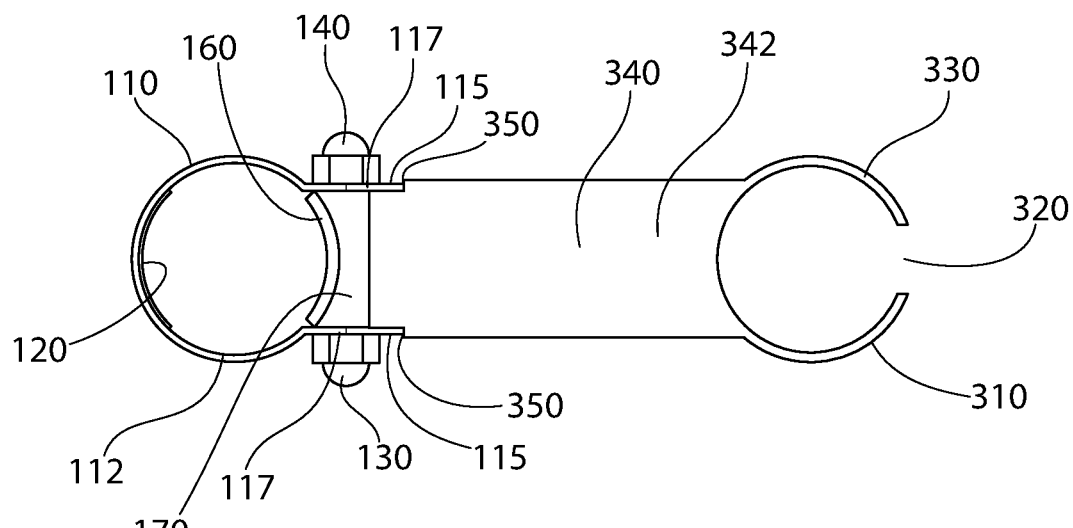
FIG. 16 is a top view of the mounting device shown in FIG. 15.
Figure 17:
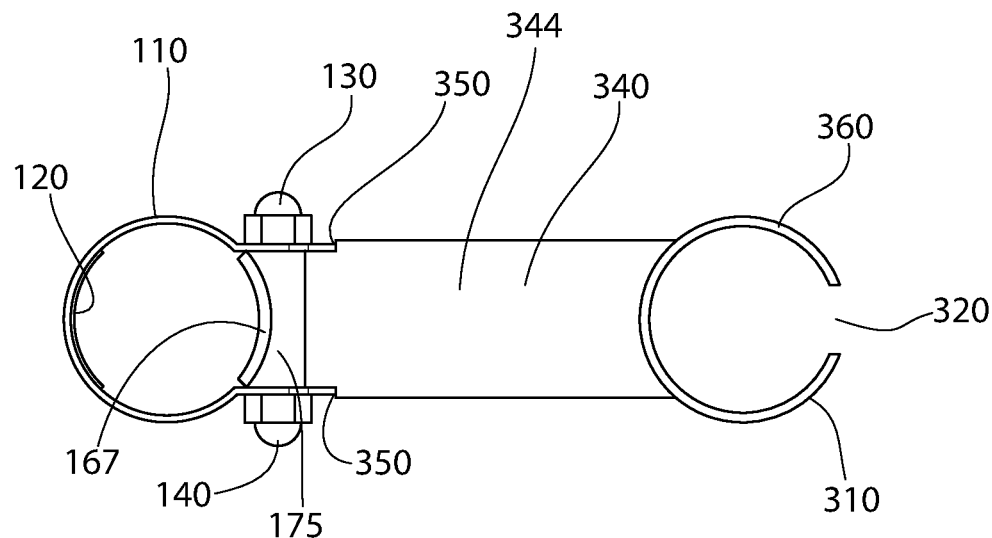
FIG. 17 is a bottom view of the mounting device shown in FIG. 15.

FIG. 16 is a top view of the mounting device shown in FIG. 15. Ramp portion 170 of rotatable clamping arm 150 as well as top bevel 160 are shown in FIG. 16. These features function similarly to how they do in the previous examples. FIG. 17 is a bottom view of the mounting device shown in FIG. 15. Bottom surface 175 of rotatable clamping arm 150 as well as lower bevel 167 are shown in FIG. 17. These features function similarly to how they do in the previous examples.

Figure 18:
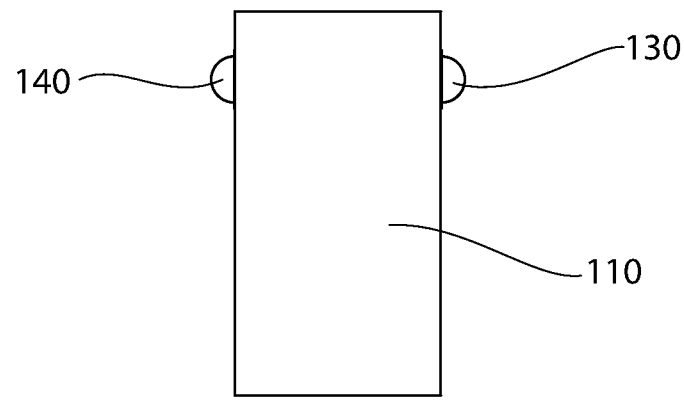
FIG. 18 is a rear view of the mounting device shown in FIG. 15.
Figure 19:
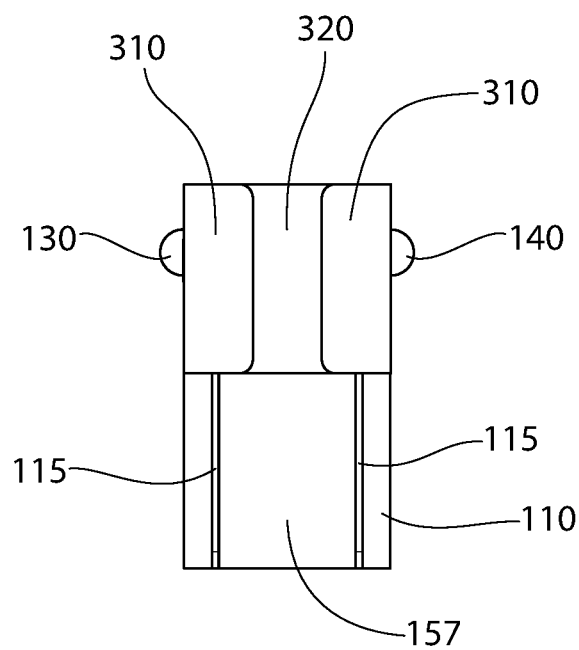
FIG. 19 is a front view of the mounting device shown in FIG. 15.
Figure 20:
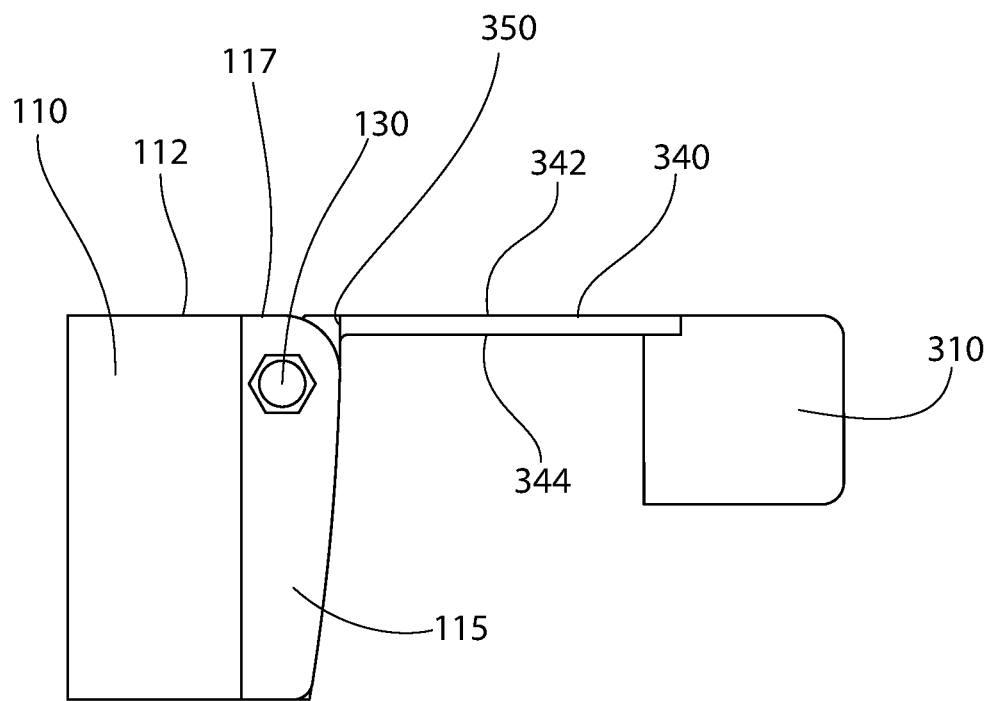
FIG. 20 is a side view of the mounting device shown in FIG. 15.

FIG. 18 is a rear view of the mounting device shown in FIG. 15. In this example, upper surface 342 of member 340 is level with edge 112 of bracket 110. However, it is noted that in other examples, upper surface 342 can be higher or lower than edge 112. FIG. 19 is a front view of the mounting device shown in FIG. 15. In this example, edges 118 of flanges 115 can be seen either side of rear surface 157. In other examples, rear surface 157 of rotatable clamping arm 150 extends laterally to cover edges 118. FIG. 20 is a side view of the mounting device shown in FIG. 15 in an in-use position. In this example, rotatable clamping arm 150 is substantially flush with flanges 115 such that rear surface 157 of rotatable clamping arm 150 and edges 118 of flanges 115 align. Also, bottom surface 175 of rotatable clamping arm 150 is aligned with the lower edges of flanges 115. However, in other examples some or all of these surfaces and edges are offset.

Figure 21:
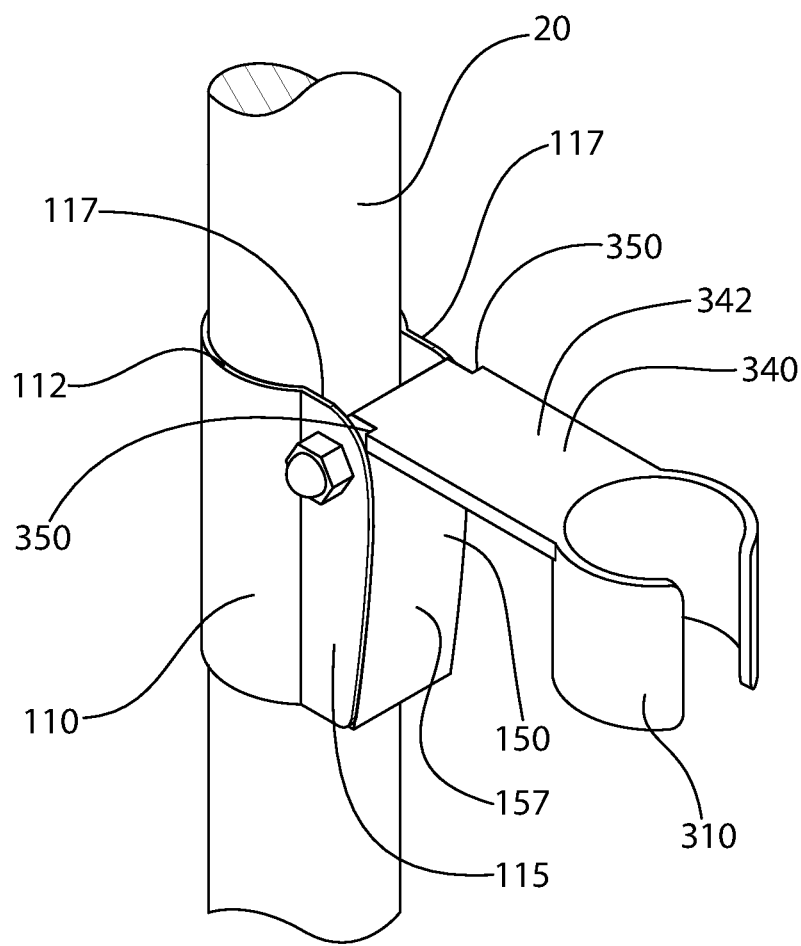
FIG. 21 is an upper perspective view of the mounting device shown in FIG. 15 attached to a pole.
Figure 22:
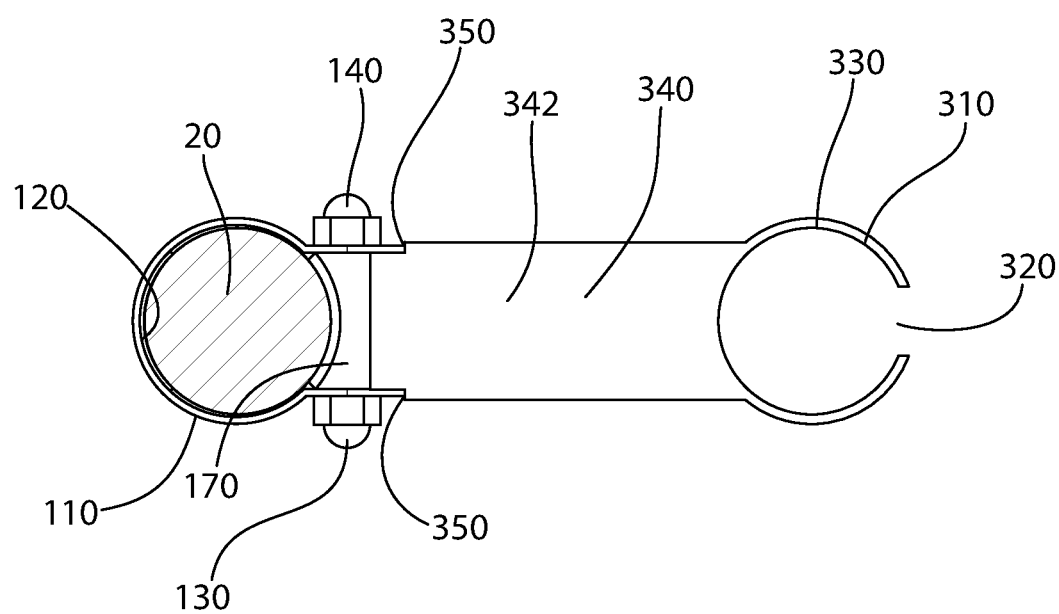
FIG. 22 is a top view of the mounting device shown in FIG. 21.

FIG. 21 shows the mounting device of FIG. 15 in an in-use position. In this position, rotatable clamping arm 150 presses against pole 20 to create sufficient friction to prevent the mounting device from moving relative to pole 20. In this position, an accessory can be inserted into receptacle 310 and held in place for use. FIG. 22 is a top view of the mounting device mounted to pole 20.

Figure 23:
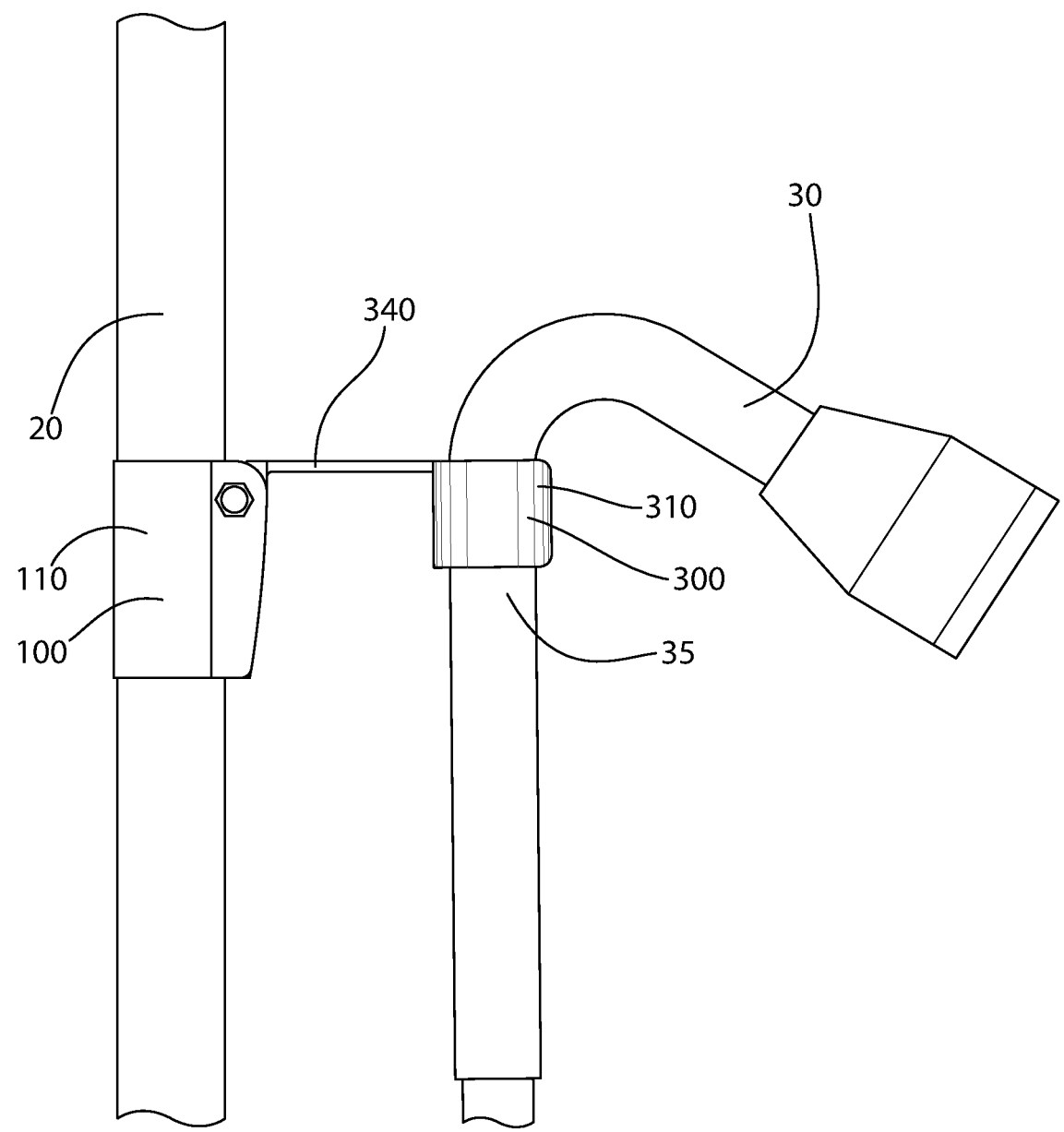
FIG. 23 is a side view of a shower fixture held by the mounting device shown in FIG. 21.

FIG. 23 shows a shower fixture 30 held in place by the mounting device of FIG. 15. In this example, a pole 35 of shower fixture 30 slides into receptacle 310 and is held in position by either a bend in pole 35 contacting receptacle 310 or by a slight taper in pole 35 producing a frictional interaction between pole 35 and the inner surface of receptacle 310. In some case, shower fixture 30 will have a hose attached to pole 35 that supplies water to pole 35. The hose can have a diameter that is small enough to pass through opening 320 (either clearing opening 320 freely or requiring force to pass through) and then pole 35 can be lowered into receptacle 310 to the point where pole 35 is held in position be receptacle 310.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents. In addition, all combinations of any and all of the features described in the disclosure, in any combination, are part of the invention.

What is claimed is:

1. A device for mounting a support item to a pole structure, the device comprising:
   a vertically oriented pole structure having a circumference;
   a mounting bracket slideably coupled to the pole structure, the mounting bracket configured to wrap around more than half of the circumference of the pole support structure, the mounting bracket comprising a pair of forwardly extending flanges each having a top edge;
   the support item having an L-shaped body comprising a supporting arm and a pivotably rotatable clamping arm pivotably attached to the mounting bracket such that the clamping arm is configured to rotate into and out of locking frictional engagement with the pole structure via pivoting the supporting arm;
   the support item being slideable on the pole structure when the clamping arm is rotated out of engagement with the pole structure in an unlocked position, the support item being locked in position on the pole structure when the clamping arm is rotated into frictional engagement with the pole structure;
   a pivot pin pivotably attaching the rotatable clamping arm to the mounting bracket; and
   the supporting arm comprising a rear edge defining a stopping surface on the support item, the stopping surface coming into contact with the top edges of the flanges of the mounting bracket when the clamping arm is in the unlocked position to prevent damaging the pole structure.

2. The device according to claim 1, wherein the locked position of the clamping arm is vertical and the unlocked position is horizontal.

3. The device according to claim 1, wherein the support item further comprises a supporting arm configured for holding a personal-use article or accessory, the supporting arm being angularly disposed relative to and rotatable in unison with the clamping arm.

4. The device according to claim 3, wherein the support item is rigidly attached to or formed integrally with the clamping arm such that rotating the supporting arm between in-use and adjustment positions concurrently rotates the clamping arm between the locked and unlocked positions, respectively.

5. The device according to claim 4, wherein the supporting arm is horizontal and cantilevered from the pole structure when in the in-use position and vertical in the adjustment position.

6. The device according to claim 5, wherein the clamping arm is vertical in the locked position and horizontal in the unlocked position.

7. The device according to claim 3, wherein the supporting arm is a soap dish comprising an elongated shelf having an upper side configured for supporting a bar of soap.

8. The device according to claim 7, wherein the shelf has a greater length than the clamping arm.

9. The device according to claim 3, wherein the mounting bracket includes an upwardly and downwardly open collar mounting portion slideably engaged with the pole structure and complementary configured thereto, and a pair of spaced apart parallel flanges extending laterally outwards from the mounting portion.

10. The device according to claim 9, wherein the pole structure has a cylindrical shape and mounting portion of the mounting bracket has a semi-cylindrical shape which does not extend completely around the circumference of the pole structure.

11. The device according to claim 9, wherein the pivot pin extends transversely through the pair of flanges and the clamping arm is received between the flanges.

12. The device according to claim 11, wherein the pivot pin is arranged to define a horizontal pivot axis of the support item.

13. The device according to claim 9, wherein an inside surface of the mounting portion of the mounting bracket includes a resiliently deformable liner which engages the pole structure.

14. The device according to claim 1, wherein the clamping arm defines an inward facing arcuately curved contact surface which engages a mating arcuately curved surface portion of the pole structure when the clamping arm is in the locked position.

15. The device according to claim 14, wherein the contact surface includes a resiliently deformable lining which frictionally engages the pole to prevent the mounting bracket from sliding down the pole.

16. A system for mounting a support apparatus comprising:
a vertically oriented cylindrical pole having a circumference;
a mounting bracket comprising a semi-cylindrical collar slideably engaged with the pole and a pair of spaced apart parallel flanges extending laterally outwards from the collar, the flanges each having a top edge;
the support apparatus having an angular body comprising a supporting arm configured for holding a personal-use article and a rotatable clamping arm extending perpendicularly from the supporting arm;
the support apparatus coupled to the mounting bracket by a pivot pin, the support apparatus being pivotably movable between an unlocked position in which the supporting arm is vertically oriented, and a locked position in which the supporting arm is horizontally oriented;
the clamping arm configured and operable to move into and out of locking frictional engagement engagement with the pole by selectively rotating the supporting arm;
the support apparatus being slideable up and down the pole when the clamping arm is disengaged from the pole;
the support apparatus being locked in position on the pole when the clamping arm is engaged with the pole;
wherein the supporting arm comprises a rear edge which contacts the top edges of the flanges of the mounting bracket when the clamping arm is in the unlocked position to prevent damaging the pole structure.

17. The system according to claim 16, wherein the body of the support apparatus is L-shaped forming a corner between adjoining terminal ends of the supporting arm and the clamping arm.

18. The system according to claim 16, wherein the pivot pin is a tightenable bolt transversely mounted through the flanges of the mounting bracket to form a horizontal pivot axis of the support apparatus, the clamping arm being arranged between the flanges and configured such that tightening the bolt does not operate to lock the support apparatus in position on the pole.

19. The system according to claim 1, wherein the rear edge of the support item extends laterally beyond the flanges of mounting bracket in opposite directions to arrange the stopping surface of the rear edge to contact the top edges of the flanges when the clamping arm is in the unlocked position.

20. A system for supporting an item on a vertical pole structure, the device comprising:
a mounting bracket slideably coupled to the pole structure, the mounting bracket configured to wrap around more than half of the pole support structure, the mounting bracket comprising a pair of forwardly extending parallel flanges each having a top edge;
an L-shaped support apparatus pivotably movable and coupled between the flanges of the mounting bracket, the support apparatus including a supporting arm configured for holding the item and a clamping arm configured to selectively rotate into and out of locking frictional engagement with the pole structure via pivoting the support apparatus;
the support apparatus being slideable on the pole structure when the clamping arm is rotated out of engagement with the pole structure in an unlocked position, the support item being locked in position on the pole structure when the clamping arm is rotated into frictional engagement with the pole structure;
the supporting arm comprising a rear edge extending laterally beyond the flanges of the mounting bracket in opposite directions;
wherein rotating the support apparatus from the unlocked position to the locked position engages the rear edge of the supporting arm with the top edges of the flanges to limit pivotably movement of the support item.

21. The device according to claim 20, wherein the flanges each comprise a rounded corner adjoining the top edges of the flanges to allow the rear edge of the supporting arm transition from a first position in front of the flanges to a second position on top of the flanges to engage the top edges.

* * * * *